(12) United States Patent
Micko et al.

(10) Patent No.: US 8,963,509 B2
(45) Date of Patent: Feb. 24, 2015

(54) METHOD AND DEVICE TO COMPENSATE FOR A DIP IN THE OUTPUT VOLTAGE OF A MOTOR-VEHICLE ALTERNATOR

(75) Inventors: Andre Micko, Changsha (CN); Michael Herz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 13/703,328

(22) PCT Filed: Jun. 6, 2011

(86) PCT No.: PCT/EP2011/059264
§ 371 (c)(1),
(2), (4) Date: Feb. 20, 2013

(87) PCT Pub. No.: WO2011/154346
PCT Pub. Date: Dec. 15, 2011

(65) Prior Publication Data
US 2013/0141055 A1    Jun. 6, 2013

(30) Foreign Application Priority Data

Jun. 11, 2010  (DE) .................... 10 2010 029 967

(51) Int. Cl.
*H02P 11/00*  (2006.01)
*H02P 9/00*  (2006.01)

(52) U.S. Cl.
USPC ............................................. 322/44; 322/28

(58) Field of Classification Search
CPC ................................. H02J 7/242; H02P 9/48
USPC .................................... 322/28, 24, 20, 44, 94
See application file for complete search history.

(56) References Cited

U.S. PATENT DOCUMENTS

| | | | | |
|---|---|---|---|---|
| 4,238,720 A * | 12/1980 | Rothman et al. | ............... | 318/800 |
| 4,520,778 A * | 6/1985 | Nanjo et al. | ................... | 123/352 |
| 6,121,757 A | 9/2000 | Takahashi et al. | | |
| 6,215,284 B1 | 4/2001 | Komurasaki et al. | | |
| 2005/0088135 A1* | 4/2005 | Sato | .............................. | 318/717 |
| 2006/0091864 A1* | 5/2006 | Watanabe et al. | ................ | 322/28 |
| 2008/0067983 A1* | 3/2008 | Okamoto | ......................... | 322/28 |
| 2008/0088282 A1* | 4/2008 | Inokuchi et al. | ................. | 322/28 |

(Continued)

FOREIGN PATENT DOCUMENTS

| | | |
|---|---|---|
| CN | 101110560 | 1/2008 |
| DE | 43 06 489 | 12/1993 |
| DE | 195 23 302 | 1/1997 |

(Continued)

OTHER PUBLICATIONS

International Search Report for PCT/EP2011/059264, dated Jul. 23, 2012.

*Primary Examiner* — Julio C. Gonzalez
(74) *Attorney, Agent, or Firm* — Kenyon & Kenyon LLP

(57) ABSTRACT

A dip in the output voltage of a motor-vehicle alternator, owing to a connecting of a load or a change in speed, is compensated with the aid of an alternator regulator which provides a control signal that has a duty factor and increases the excitation current of the motor-vehicle alternator. After the occurrence of the voltage dip, in a first step, the duty factor of the control signal is increased by a differential amount, and in a subsequent second step, the rate of correction is limited. After the occurrence of the voltage dip, parameters describing the instantaneous working point of the motor-vehicle alternator are determined, and in the first step, the differential amount is set as a function of the working point.

12 Claims, 2 Drawing Sheets

(56) References Cited

U.S. PATENT DOCUMENTS

2009/0039838 A1*  2/2009  Maehara .................. 322/19
2010/0282209 A1* 11/2010  Gray ..................... 123/350

FOREIGN PATENT DOCUMENTS

| | | |
|---|---|---|
| DE | 199 05 984 | 8/1999 |
| DE | 199 44 621 | 3/2001 |
| DE | 696 16 663 | 8/2002 |
| DE | 102 34 088 | 2/2004 |
| DE | 102 34 089 | 2/2004 |
| DE | 697 28 032 | 9/2004 |
| DE | 103 61 215 | 7/2005 |
| DE | 10 2007 000 618 | 8/2008 |
| DE | 10 2010 002 738 | 10/2010 |
| GB | 246 39 17 | 9/2008 |
| JP | 71 11 799 | 4/1995 |
| JP | 11-234921 | 8/1999 |
| JP | 2006-121869 | 5/2006 |
| WO | WO 00/30236 | 5/2000 |
| WO | WO 2007/132213 A1 * | 11/2007 |

* cited by examiner

METHOD AND DEVICE TO COMPENSATE FOR A DIP IN THE OUTPUT VOLTAGE OF A MOTOR-VEHICLE ALTERNATOR

BACKGROUND OF THE INVENTION

1. Field of the Invention

The present invention relates to a method and a device to compensate for a dip in the output voltage of a motor-vehicle alternator.

2. Description of the Related Art

The electrical system of a motor vehicle is supplied with energy by an alternator whose output voltage is regulated by an alternator regulator to a predefined value, e.g., to 14V. The connecting of loads or speed changes in the motor vehicle may lead to a dip in the vehicle voltage. The alternator regulator corrects this voltage dip, which means the torque demand on the drivetrain or on the engine increases. Due to the connecting of the load, a higher torque is needed to drive the alternator. The regulation is carried out by increasing the excitation current in the rotor of the alternator device. This increase is brought about by an increase in the duty factor of a PWM signal set by the alternator regulator. The voltage induced in the stator is increased by the change in the magnetic field resulting from the excitation current.

In the case of a rapid correction of a voltage dip, a correspondingly rapid rise also comes about in the torque-determining excitation current. Particularly at low speeds, the engine is often unable to bring up the torque sufficiently rapidly. In this case, the engine is decelerated by the alternator. This may cause the engine to stall.

To prevent such a stalling of the engine, it is already known to limit the correction rate of an alternator regulator in the lower speed range. This "load response function" limits the rate of change of the duty factor when it must be increased because of a voltage dip. The rate of change in the torque is thereby influenced to the same extent, so that the engine has more time to react to the increased torque demands. However, this procedure has the disadvantage that a corresponding delay thereby occurs in correcting the voltage dip. The voltage dip lasts longer.

If only small loads are connected, and thus the duty factor only has to be increased slightly, then the torque is also increased only slightly, which as a rule, is not critical for the engine. So as not to have to put up with a voltage-dip correction which is slow owing to the load response function in the case of such small load changes as well, it is already known to initially increase the duty factor by a predefined value, also known as "blindzone" or "blind zone", so that the reaction to the voltage dip is rapid, and only afterwards to further increase with the rate of rise limited by the load response function.

The "blindzone" or "blind zone" is defined as the duty factor delta, within which a rapid correction can take place. In the case of present-day regulators, the "blind zone" is set to a fixed value or may be switched between two values. The possible loads thereby resulting, which may be corrected quickly, as well as the possible changes in torque ensuing from them, are not constant, but rather, are a function of the specific working point of the alternator. Reasons for this dependency on the working point are, for example, the properties of the excitation winding (resistance and inductance) alterable by temperature, as well as the disproportionality of the excitation current to the alternator current, which is caused by the saturation behavior of the iron core of the rotor.

Published German patent application document DE 199 05 984 A1 describes a control device for a motor-vehicle alternator which is driven by an internal combustion engine and, after a rectification of the output voltage generated by it, charges a battery. This control device has a voltage regulator which controls the charging voltage of the battery to a constant value, and a device which gradually raises the current of the alternator after an electrical load has been switched on. The increase amount of a control current of a power circuit-breaker for controlling the excitation current of the alternator at an instant directly after the electrical load is switched on, but prior to the activation of the device for controlling a gradual excitation, is set as a function of the power-generation conditions of the alternator. In particular, the increase amount of the control current of the power circuit-breaker for controlling the excitation current of the alternator is set as a function of the current of the alternator in such a way that the increase amount is raised in response to great alternator current, and lowered in response to small alternator current. As an alternative, the increase amount of the control current of the power circuit-breaker for controlling the excitation current is set in such a way that it is proportional to the excitation-current value prior to the electrical load being switched on. In this way, given the use of the same control device for alternators having different alternator-output capacities, the output current of the alternator in question, which represents a one-time and immediate response to a switching-on of a load prior to the activation of the control of a gradual excitation that increases the alternator current gradually, is held essentially constant.

BRIEF SUMMARY OF THE INVENTION

In contrast, a method and a device according to the present invention have the advantage that the differential amount, by which the duty factor of the control signal is increased, is selected as a function of the working point existing in each instance. This adaptation of the blindzone to the working point existing in each instance leads advantageously to a predictable and clearly defined behavior of the alternator, which may be optimized for the respective working points of the engine. In this manner, for example, more complex functions in the control device with respect to the reaction to changes in torque at the drivetrain caused by the alternator may be minimized.

Further advantages of the present invention are that not always constant conditions, e.g., constant changes in torque or constantly rapidly correctable voltage dips, exist at the different working points; rather, different conditions may also exist, e.g., different working points may be assigned to different torque changes.

DETAILED DESCRIPTION OF THE INVENTION

Figure 1:
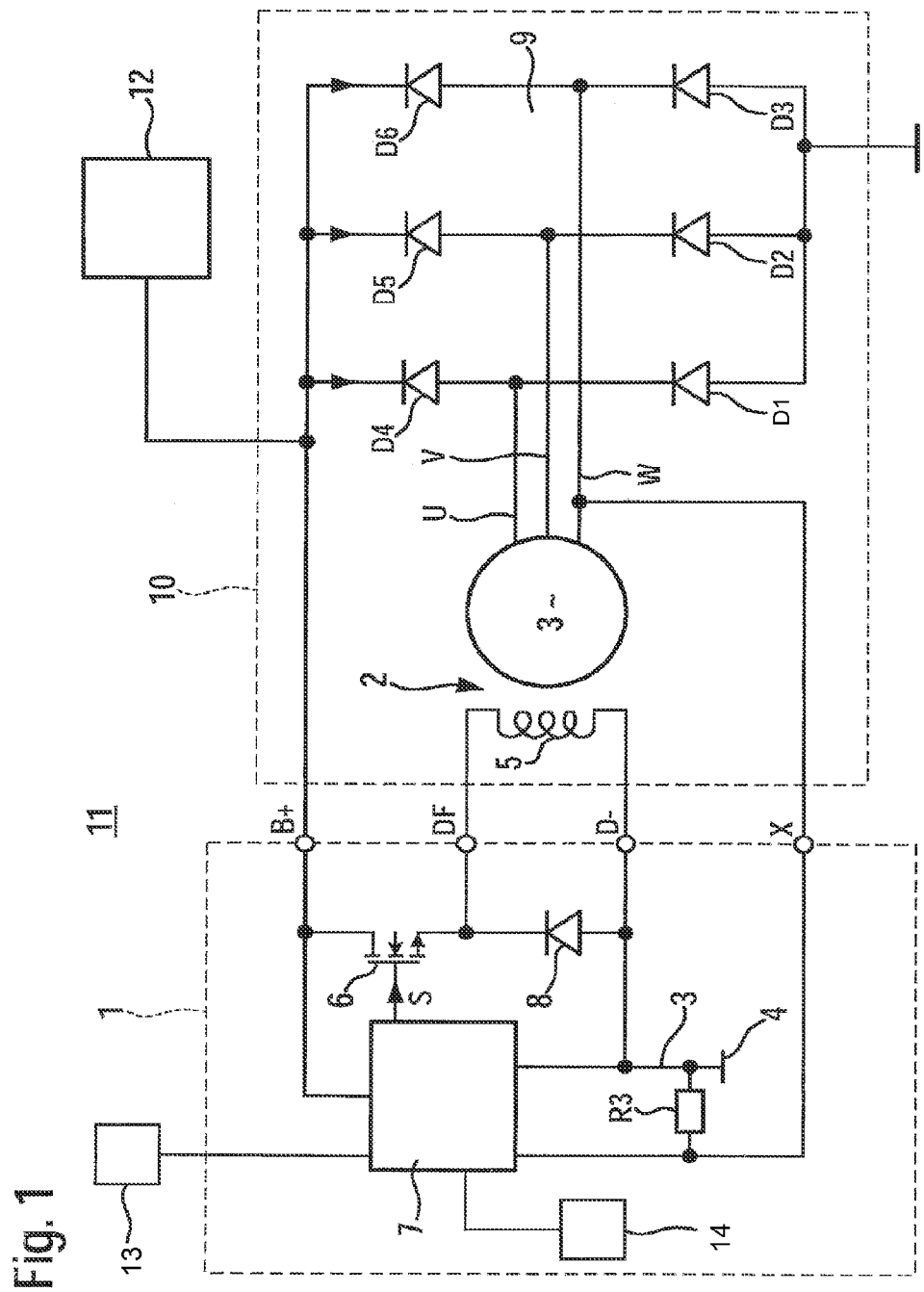
FIG. 1 shows a circuit diagram for clarifying a device to compensate for a dip in the output voltage of a motor-vehicle alternator owing to the connecting of a load.

FIG. 1 shows a circuit diagram for clarifying a device to compensate for a dip in the output voltage of a motor-vehicle alternator owing to the connecting of a load. The device illustrated has an alternator device 11, electrical system 12 of the motor vehicle and detector means 13. Alternator device 11 includes an alternator regulator 1 and an alternator unit 10 which, at its output, makes a supply DC voltage available for electrical system 12 of a motor vehicle.

Alternator unit 10 has an alternator 2 and a rectifier configuration 9. Alternator 2 includes an excitation winding 5 and phase windings (not further shown) which, for example, are interconnected in the form of a star connection or a delta connection. At its phase-voltage terminals U, V and W, alternator 2 makes AC voltages available, which are supplied to downstream rectifier configuration 9. As an alternative to the exemplary embodiment shown, a different number of phases or phase-voltage terminals may also be provided.

Rectifier configuration 9 includes three branches, of which each has a series connection of two diodes or other suitable components, and is assigned to a different one of the phase-voltage terminals of the alternator.

Phase-voltage terminal U of alternator 2 is connected to the connection point between diodes D1 and D4 of the first rectifier branch. Phase-voltage terminal V of alternator 2 is connected to a connection point between diodes D2 and D5 of the second rectifier branch. Phase-voltage terminal W of alternator 2 is connected to a connection point between diodes D3 and D6 of the third rectifier branch.

The cathodes of diodes D4, D5 and D6 are connected to each other. There, the output DC voltage of alternator unit 10 is made available and passed on to electrical system 12. The anodes of diodes D1, D2 and D3 are likewise connected to each other and connected to ground.

In addition, phase-voltage terminal W of alternator 2 is connected, via a terminal X of alternator regulator 1, to regulator control 7 of alternator regulator 1, and via a resistor R3 and a ground connection 3 of the alternator regulator, to ground 4.

Alternator regulator 1 has an operating-voltage terminal B+, as well as further terminals DF, D– and X. Furthermore, the alternator regulator includes a regulator control 7, which is provided with an evaluating logic. Regulator control 7 is provided to make a PWM-control signal s available to a switching transistor 6. Regulator control 7 is furthermore connected to operating-voltage terminal B+, and to ground 4 via ground connection 3. Regulator control 7 is also connected to terminal X of alternator regulator 1, in order to receive a phase-voltage signal derived from phase-voltage terminal W of alternator 2.

Moreover, the device shown in FIG. 1 has an excitation circuit. It takes a course from operating-voltage terminal B+ of alternator regulator 1, across switching transistor 6 of the alternator regulator, terminal DF of the alternator regulator, excitation winding 5, terminal D- of the alternator regulator and ground connection 3 to ground 4. Either a freewheeling diode 8 is connected between terminals D– and DF of alternator regulator 1, or an active freewheel is used with a switching transistor.

Regulator control 7, which is connected to operating-voltage terminal B+ and, via terminal X, to phase-voltage terminal W of alternator 2, controls switch 6 with control signal s in such a way that an excitation current flows through excitation winding 5, which is a function both of the DC voltage present at operating-voltage terminal B+ and, at times, of the phase voltage supplied to it via terminal X.

If, in such a device, because of the connecting of a load in the electrical system a dip occurs in the output voltage of the motor-vehicle alternator, this is then detected by regulator control 7. The regulator control is designed in such a way that, in response to the occurrence of such a voltage dip, it brings about a correction of the voltage dip. This is accomplished as follows:

After a load is connected, regulator control 7 acquires the parameter values of the signals supplied to it by detector means 13. These signals correspond to parameters which describe the instantaneous working point of motor-vehicle alternator 2, so that from the parameter values supplied to it, the regulator control is able to ascertain the instantaneous working point of the motor-vehicle alternator. Among these parameters, whose parameter values allow conclusions about the instantaneous working point of the motor-vehicle alternator, are a speed and a temperature. This speed is the alternator speed and/or the engine speed. The temperature is the alternator temperature and/or the regulator temperature and/or the engine-compartment temperature and/or the ambient temperature. Further parameters describing the instantaneous working point of the motor-vehicle alternator are, for example, the load of the alternator and/or the excitation current and/or the duty factor and/or the battery voltage and/or the alternator voltage. The information about the excitation current and the duty factor is available to the regulator control in any case. The information about further parameters, whose parameter values allow conclusions about the instantaneous working point of the motor-vehicle alternator, are supplied to the regulator control by detector means 13.

If the regulator control has ascertained the instantaneous working point of the motor-vehicle alternator from the parameters indicated, it then selects a working-point-dependent amount, corresponding to this working point, by which the instantaneous duty factor of control signal s is increased, in order to set in motion a correction of the voltage dip occurring which is optimal for this working point, and in a first step, supplies a control signal s with the increased duty factor to switching transistor 6. The excitation current flowing through excitation winding 5 is thereby increased as well, which in turn, leads to an increase in the output voltage of the alternator device.

In order to select the working-point-dependent amount by which the instantaneous duty factor of control signal s is increased, regulator control 7 addresses a memory 14 in which a characteristic map is stored, where a differential amount is assigned to each of a plurality of working points.

In a second step, the regulator control subsequently generates control signal s in such a way that the correction rate is limited, and hence a load response function is carried out.

Therefore, in the present invention, after a voltage dip has occurred owing to the connecting of a load, first of all, the instantaneous working point of the motor-vehicle alternator is ascertained, and the duty factor of control signal s supplied to switching transistor T6 is increased by a differential amount as a function of the working point. After that, in a second step, the rate of correction is limited in the sense of a load response function.

Figure 2A:
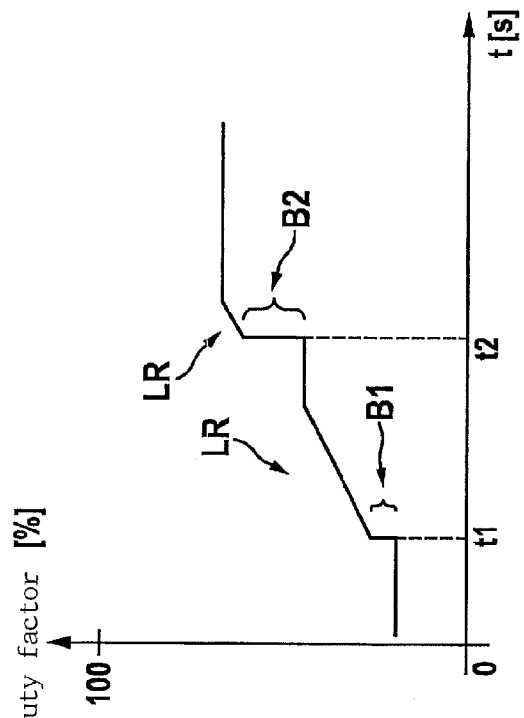
FIG. 2 shows diagrams for clarifying a known method.
Figure 2B:
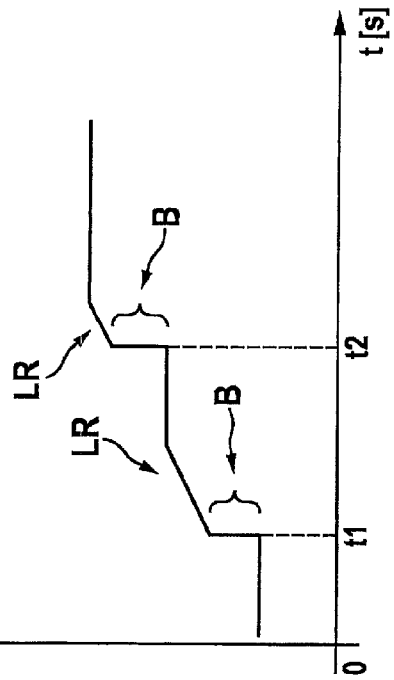

FIG. 2 shows diagrams to clarify a known method. In FIG. 2a, the duty factor of control signal s is plotted against time, in FIG. 2b, load L of the alternator is plotted against time. A first load is connected at an instant t1, and a second load is connected at an instant t2. Both load connectings cause a dip in the output voltage provided by the alternator device.

From FIG. 2a, it is evident that in a first step, the duty factor of control signal s is increased suddenly by an amount B at instant t1, and then in a second step, further increases slowly along the lines of a load response function, in order to correct the voltage dip. After that, the duty factor remains unchanged up to instant t2. At instant t2, in a first step, the duty factor of control signal s is again increased suddenly by amount B, and after that, in a second step, is again further increased slowly along the lines of a load response function, in order to compensate for the further voltage dip. The amount by which the duty factor of control signal s is increased suddenly, i.e., blindzone B, matches in the case of both load connectings, and is independent of the working point at which the alternator presently finds itself at the instant the respective load is connected. The duration of the load response function, which lasts until the respective voltage dip is corrected, is differing in the exemplary embodiment shown.

From FIG. 2b, it is evident that, owing to the connecting of the load at instant t1, the portion of the connected load corrected rapidly over the blindzone, i.e., before the load response function commences, has the value Δ1, and owing to the connecting of the load at instant t2, the rapidly corrected portion of the connected load has the value Δ2, Δ1 being greater than Δ2. This is attributable to the fact that the alternator is at a different working point at instant t1 than at instant t2.

Figure 3A:
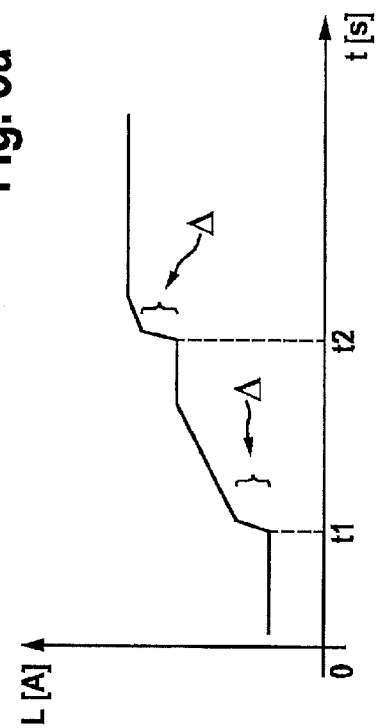
FIG. 3 shows diagrams for clarifying a method according to the present invention.
Figure 3B:
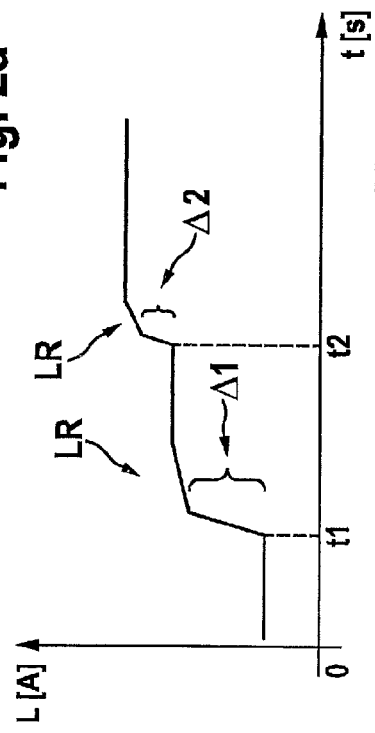

FIG. 3 shows diagrams for clarifying a method according to the present invention. In FIG. 3a, the duty factor of control signal s is plotted against time, in FIG. 3b, load L of the alternator is plotted against time. A first load is connected at an instant t1, and a second load is connected at an instant t2. Both load connectings cause a dip in the output voltage provided by the alternator device.

From FIG. 3a, it is evident that in a first step, the duty factor of control signal s is increased suddenly by an amount B1 at instant t1, and then in a second step, further increases slowly along the lines of a load response function, in order to correct the voltage dip. After that, the duty factor remains unchanged up to instant t2. At instant t2, in a first step, the duty factor of control signal s is increased suddenly by amount B2, and after that, in a second step, is further increased slowly along the lines of a load response function, in order to compensate for the further voltage dip. The amount by which the duty factor of control signal s is increased suddenly, i.e., the blindzone, is differing for the two load connectings. In the case of the load connecting at instant t1, a blindzone B1 is used, and for the load connecting at instant t2, a blindzone B2 is used, B1 being greater than B2 in the exemplary embodiment shown. The blindzone is selected as a function of the working point existing at the instant the respective load is connected, as was explained above in connection with FIG. 1. The duration of the load response function, which lasts until the respective voltage dip is corrected, is differing in this exemplary embodiment, as well.

From FIG. 3b, it is evident that the rapidly corrected portion of the connected load at instant t1 and the rapidly corrected portion of the connected load at instant t2 each have the value Δ, thus, agree.

What is claimed is:

1. A method of compensating for a voltage dip in an output voltage of an alternator of a motor-vehicle, due to one of connection of a load to the motor-vehicle and a change in a speed of the motor-vehicle, with the aid of an alternator regulator which provides a control signal having a duty factor, the method comprising:
   acquiring, after the occurrence of the voltage dip, parameters describing an instantaneous operating point of the motor-vehicle alternator;
   initially increasing the duty factor of the control signal of the alternator regulator by a differential amount which is set as a function of the acquired instantaneous operating point, whereby the increased duty factor of the control signal increases an excitation current of the motor-vehicle alternator; and
   subsequently limiting the rate of increase of the duty factor of the control signal to a selected maximum rate.

2. The method as recited in claim 1, wherein the parameters describing the instantaneous operating point of the motor-vehicle alternator include at least a speed parameter and a temperature parameter.

3. The method as recited in claim 2, wherein the speed parameter includes at least one of a speed of the alternator and a speed of an engine of the motor vehicle.

4. The method as recited in claim 3, wherein the temperature parameter includes at least one of: a temperature of the alternator; a temperature of the alternator regulator; a temperature of an engine-compartment; and an ambient temperature.

5. The method as recited in claim 4, wherein the parameters describing the instantaneous operating point of the motor-vehicle alternator include at least one of: a load of the alternator; the excitation current; the duty factor of the control signal; a voltage of a vehicle battery; and a voltage of the alternator.

6. The method as recited in claim 4, wherein the differential amount is selected from a stored characteristic map which assigns each one of a plurality of operating points of the motor-vehicle alternator to a corresponding one of a plurality of differential amounts.

7. The method as recited in claim 6, wherein different differential amounts are assigned to different operating points of the motor-vehicle alternator.

8. The method as recited in claim 1, wherein the parameters describing the instantaneous operating point of the motor-vehicle alternator are assigned to different torque changes.

9. A device for compensating for a voltage dip in an output voltage of an alternator of a motor-vehicle, due to one of connection of a load to the motor-vehicle and a change in a speed of the motor-vehicle, the device comprising:
   a detection unit which determines, after the occurrence of the voltage dip, operating parameters describing an instantaneous operating point of the motor-vehicle alternator; and
   an alternator regulator connected to the detection unit and providing a control signal having a duty factor, wherein after the occurrence of the voltage dip, the alternator regulator (i) initially increases the duty factor of the control signal of the alternator regulator by a differential amount which is set as a function of the instantaneous operating point of the motor-vehicle alternator determined based on the determined operating parameters, whereby the increased duty factor of the control signal increases an excitation current of the motor-vehicle alternator, and (ii) subsequently limits the rate of increase of the duty factor of the control signal to a selected maximum rate.

10. The device as recited in claim 9, further comprising:
   a memory unit storing a characteristic map which assigns each one of a plurality of operating points of the motor-vehicle alternator to a corresponding one of a plurality of differential amounts.

11. The device as recited in claim 10, wherein, in the characteristic map, different differential amounts are assigned to different operating points of the motor-vehicle alternator.

12. The device as recited in claim 11, wherein:
   the alternator regulator is configured to provide the control signal to a switching transistor to initially increase the duty factor;
   the duty factor of the control signal is increased by the differential amount according to an assigned operating point; and the assigned operating point corresponds to the instantaneous operating point.

* * * * *